UNITED STATES PATENT OFFICE.

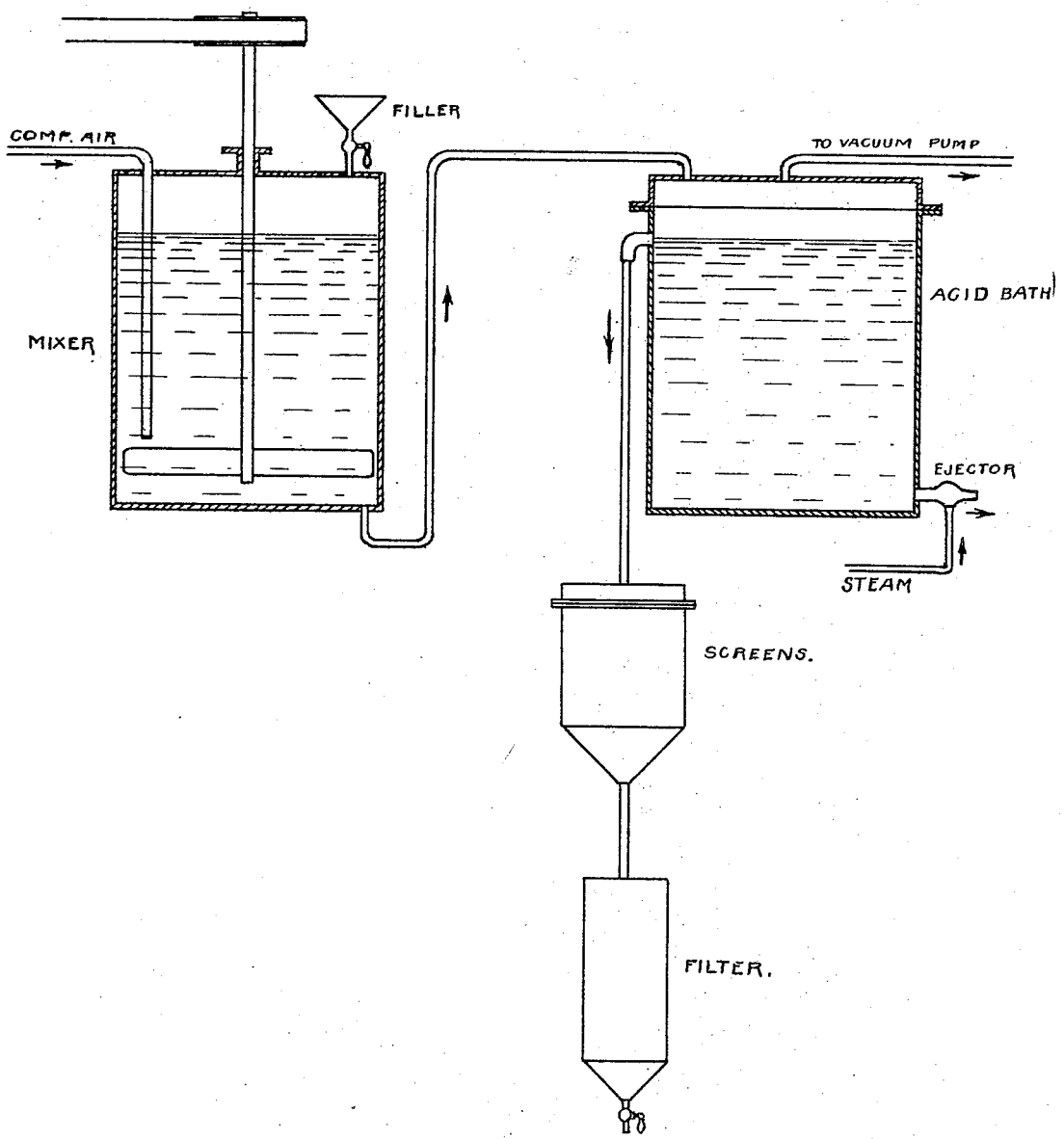

CARL SCHICK, OF SIEGEN, GERMANY.

PROCESS FOR TREATING ORES.

1,055,495.  Specification of Letters Patent.  Patented Mar. 11, 1913.

Application filed November 14, 1912. Serial No. 731,403.

*To all whom it may concern:*

Be it known that I, CARL SCHICK, a subject of the King of Prussia, German Emperor, and resident of Siegen, in Westphalia, Kingdom of Prussia, German Empire, have invented certain new and useful Processes for Treating Ores, of which the following is a specification.

This invention relates to a process for the treatment of sulfid or compound sulfid and carbonate, ore slimes and ores by the levigation process. In the already known levigation process by the use of oil or paraffin or ordinary aliphatic hydro-carbons, the separation of the floating products is not easily effected. The evaporation of the oil occasions bad yields in the subsequent division of the sulfid ores by the well known process of washing. Recently it has been proposed to use eucalyptus oil for the levigation process. This oil easily evaporates in the air after the levigation, so that the ore can be separated from the gangue without further operations. It is obvious, however, that this process is too costly, both on account of the prime cost of the aforesaid oil and also on account of the losses of oil; moreover, the evaporation of the oil occasions great danger for the health of the workmen and inhabitants, unless by the use of expensive apparatus, the eucalyptus oil is removed from the evaporation current, or is burned in a red-hot carbon column. It has been proposed to use a hydrocarbon of the aliphatic series and especially carbon tetra-chlorid. The tetra-chlorid compound has however the following drawbacks:—Firstly, it is easily soluble in water which occasions great losses in the levigation, and moreover, the price of it is very high. Also, the disagreeable smell of this compound has prevented hitherto its use in practice. It was further, proposed to use phenol and kresol. These materials also are not serviceable in practice both on account of the high cost and on account of their easy solubility in water.

The figure shows diagrammatically an apparatus used in connection herewith.

According to the present invention there are employed for the purpose of the treatment of the sulfid or preferably compound carbonate and sulfate ores chlorid of benzol or nitro-benzol, each separately or in combination as carriers of the metallic particles. Both these compounds are insoluble in water and therefore are excellently suitable for the purpose especially on account of their cheapness for the treatment after the levigation process. The process permits of a preliminary treatment of ore slimes of the aforesaid kind with the best yields. Moreover it affords a great technical advantage because in the place of oil the cheapest by-products of the chemical industry can find a use and because the application of these products on account of their great adhesiveness secures a very considerable yield even with the very finest particles of ore. Further, the aforesaid materials are easily extracted after the separation of the ore from the gangue, after which the ore slimes can be divided into the separate ores by well known mechanical means in cases where several ores are present.

The following is given by way of example of the process. 100 kgs. of lead-zinc ore slimes (sulfids) containing 20% of metal are treated alone or mixed with ½% of iron ore with two grams of bi-chlorid of benzol ($C_6H_4Cl_2$) stirred up together in a vessel and passed under pressure into an acid, such as dilute sulfuric, bath of 35° Celsius. There then takes place a complete separation of the crude iron ore and gangue on the one hand and of the sulfid ores on the other inasmuch as these ores rise to the surface and the iron ore and the gangue sink down. By means of an elevator resistant to acid or by means of an ejector the refuse is continually removed from the bottom of the vessel and the floating ores are collected upon strainers. Also by the use of tri-chlorid of benzol and various substitution products of the benzol series and also of nitro products of benzol derivatives the same advantages have been attained in a most surprising manner. The application of a vacuum facilitates the process and is therefore preferably employed. By the treatment with extraction materials in suitable vessels the thus obtained ore slime free from gangue is then extracted. Hereby a product is obtained containing sulfid of lead and sulfid of zinc, which can be easily further treated in suitable smelting furnaces. As the gangue is practically all removed from this product all the zinc ore and lead ore containing silver can be recovered from the liquors through filter apparatuses.

For the reasons above set forth the advantages of this new process as compared with old processes are obvious and moreover it has proved in practice that the other levigating processes with the exception of the one by aid of eucalyptus oil give a product which can only be sub-divided into its component ores imperfectly.

Having now particularly described and ascertained the nature of my said invention and in what manner the same is to be performed, I declare that what I claim is:

1. That process of treating ore slimes which consists in mixing the slimes with a benzol derivative, agitating the mixture, subjecting the mixture to an acid bath, and permitting the settlement of the mixture.

2. That process of treating ore slimes which consists in mixing the slimes with a chlorin derivative of benzol, agitating the mixture, subjecting the mixture to an acid bath, and permitting the settlement of the mixture.

3. That process of treating ore slimes which consists in mixing the slimes with a chlorin derivative of benzol and a nitrogen derivative of benzol, agitating the mixture, subjecting the mixture to an acid bath, and permitting the settlement of the mixture.

In testimony, whereof I have signed my name to this specification in the presence of two subscribing witnesses.

CARL SCHICK.

Witnesses:
 JOSEPH STOOTIEN,
 THEODOR MERKENICH.